United States Patent
Welch et al.

(10) Patent No.: US 7,585,025 B2
(45) Date of Patent: Sep. 8, 2009

(54) ERGONOMIC CLOSEOUT

(75) Inventors: Thomas Welch, Ortonville, MI (US); William Parusziewicz, Clinton Township, MI (US); Larry Hulme, St. Clair Shores, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/608,835

(22) Filed: Dec. 10, 2006

(65) Prior Publication Data

US 2008/0136142 A1 Jun. 12, 2008

(51) Int. Cl.
*A47C 27/00* (2006.01)

(52) U.S. Cl. ............. 297/218.2; 297/220; 297/228.13; 297/463.1

(58) Field of Classification Search ............. 297/218.2, 297/220, 228.13, 463.1, 463.2
See application file for complete search history.

(56) References Cited

U.S. PATENT DOCUMENTS

| | | | |
|---|---|---|---|
| 3,632,164 A | 1/1972 | Radke | |
| 3,794,378 A | 2/1974 | Haslam et al. | |
| 3,925,861 A | 12/1975 | Tillner | |
| 4,609,226 A | 9/1986 | Yoshizawa | |
| 4,643,480 A | 2/1987 | Morita | |
| 4,789,201 A | 12/1988 | Selbert | |
| 4,833,741 A | 5/1989 | Mizuno et al. | |
| 4,865,383 A | 9/1989 | Sbaragli et al. | |
| 5,398,482 A | 3/1995 | Hessell, Jr. et al. | |
| 5,401,075 A * | 3/1995 | Venuto et al. ............. 297/218.2 |
| 5,586,807 A | 12/1996 | Taggart | |
| 5,588,672 A | 12/1996 | Karlow et al. | |
| 5,641,552 A | 6/1997 | Tillner | |
| 5,702,159 A | 12/1997 | Matsuoka et al. | |
| 5,733,001 A | 3/1998 | Roberts | |
| 5,762,842 A | 6/1998 | Burchi et al. | |
| 5,816,660 A | 10/1998 | Johnson, III et al. | |
| 5,820,213 A * | 10/1998 | Severinski ............... 297/218.5 |
| 5,820,222 A * | 10/1998 | De Filippo ............. 297/452.58 |
| D405,637 S * | 2/1999 | Licata et al. ................. D6/611 |
| 5,879,055 A | 3/1999 | Dishner et al. | |
| 5,882,073 A | 3/1999 | Burchi et al. | |
| 5,951,039 A | 9/1999 | Severinski et al. | |
| 5,964,017 A | 10/1999 | Roberts | |

(Continued)

FOREIGN PATENT DOCUMENTS

DE 26 43 322 A1 3/1978

(Continued)

*Primary Examiner*—Laurie K Cranmer
(74) *Attorney, Agent, or Firm*—Brooks Kushman P.C.

(57) ABSTRACT

A head restraint assembly of this embodiment includes a bun and a post. The post is adapted to attach the head restraint assembly to a vehicle seat. The head restraint bun includes a head restraint core and a trim cover. The trim cover surrounds at least a portion of the head restraint core. The trim cover includes a close-out section at which the trim cover is closed after the head restraint core is placed within the trim cover. A retainer clip is attached to the head restraint core at an attachment region. The head restraint assembly also includes a close-out retainer bracket which is attached to a close-out section of the trim cover. When the trim cover is in a closed position, the close-out retainer bracket is secured to the retainer clip. A method of assembly head restraints is also provided.

18 Claims, 4 Drawing Sheets

U.S. PATENT DOCUMENTS

| | | |
|---|---|---|
| 6,206,467 B1 | 3/2001 | Mense et al. |
| 6,364,347 B1 | 4/2002 | Holdampf et al. |
| 6,382,665 B2 | 5/2002 | Holdampf et al. |
| 6,478,381 B1 | 11/2002 | Cramb, III et al. |
| 6,814,412 B2 | 11/2004 | Cramb, III et al. |
| 6,843,520 B1 | 1/2005 | Modreski et al. |
| 6,857,699 B2 * | 2/2005 | Ashton et al. ............... 297/220 |
| 6,899,399 B2 | 5/2005 | Ali et al. |
| 7,172,246 B1 * | 2/2007 | Itakura .................... 297/219.1 |
| 2001/0019202 A1 | 9/2001 | Holdampf et al. |
| 2002/0024243 A1 | 2/2002 | Peterson |
| 2002/0043833 A1 | 4/2002 | Michot et al. |
| 2002/0074845 A1 | 6/2002 | Perske et al. |
| 2002/0101109 A1 | 8/2002 | Stiller et al. |
| 2003/0001421 A1 | 1/2003 | Schmidt |
| 2003/0122413 A1 | 7/2003 | Cramb, III et al. |
| 2005/0006944 A1 | 1/2005 | Ali et al. |
| 2005/0179306 A1 | 8/2005 | White et al. |

FOREIGN PATENT DOCUMENTS

| | | |
|---|---|---|
| DE | 101 30 250 A1 | 1/2003 |
| WO | 02/12016 A2 | 2/2002 |

* cited by examiner

ERGONOMIC CLOSEOUT

BACKGROUND OF THE INVENTION

1. Field of the Invention

The present invention relates to head restraints having a trim cover with an aesthetically pleasing closeout region.

2. Background Art

Vehicular head restraints are mounted to passenger seats for use in vehicles to provide passenger head restraint. Well known conventional head restraints includes a padded head restraint body covered with a flexible upholstery material, and extend above the back support region of a seat with the head restraint typically attached directly to the seat.

In some prior art head restraints, the head restraint includes a post for attaching the head restraint to a vehicle seat and a foam core. Foam cores are commonly made from polyester. A trim cover encases the foam core. Typically, these trim covers are formed from cloth fabric, vinyl, and leather. To provide a pleasing appearance, trim covers are formed into pouch-shaped structures by sewing panels together. Such structures may eliminate the need for zippers or other fasteners. Many prior art head restraints have depressions, especially on the bottom side. In these circumstances, the trim cover tends to undesirably bridge across such depressions thereby reducing the aesthetic appeal of the head restraint.

Accordingly, there exists a need for improved head restraint assemblies and for methods of forming such head restraint assemblies.

SUMMARY OF THE INVENTION

The present invention solves one or more problems of the prior art by providing in one embodiment a head restraint assembly. The head restraint assembly of this embodiment includes a bun and a post. The post is adapted to attach the head restraint assembly to a vehicle seat. The head restraint bun includes a head restraint core and a trim cover. The trim cover surrounds at least a portion of the head restraint core. The trim cover includes a close-out section at which the trim cover is closed after the head restraint core is placed within the trim cover. A retainer clip is attached to the head restraint core at an attachment region. Many prior art head restraints include regions with indentations or depressions (typically at the bottom of the head restraint). Advantageously, the head restraint of the present embodiment allows placement of the trim cover without bridging or with reduced bridging of the cover across these regions thereby creating a more ergonomic design than the prior art. The head restraint assembly also includes a close-out retainer bracket which is attached to a close-out section of the trim cover. When the trim cover is in a closed position, the close-out retainer bracket is secured to the retainer clip.

In another embodiment of the present invention, a method for assembling the head restraint assembly set forth above is provided.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1:
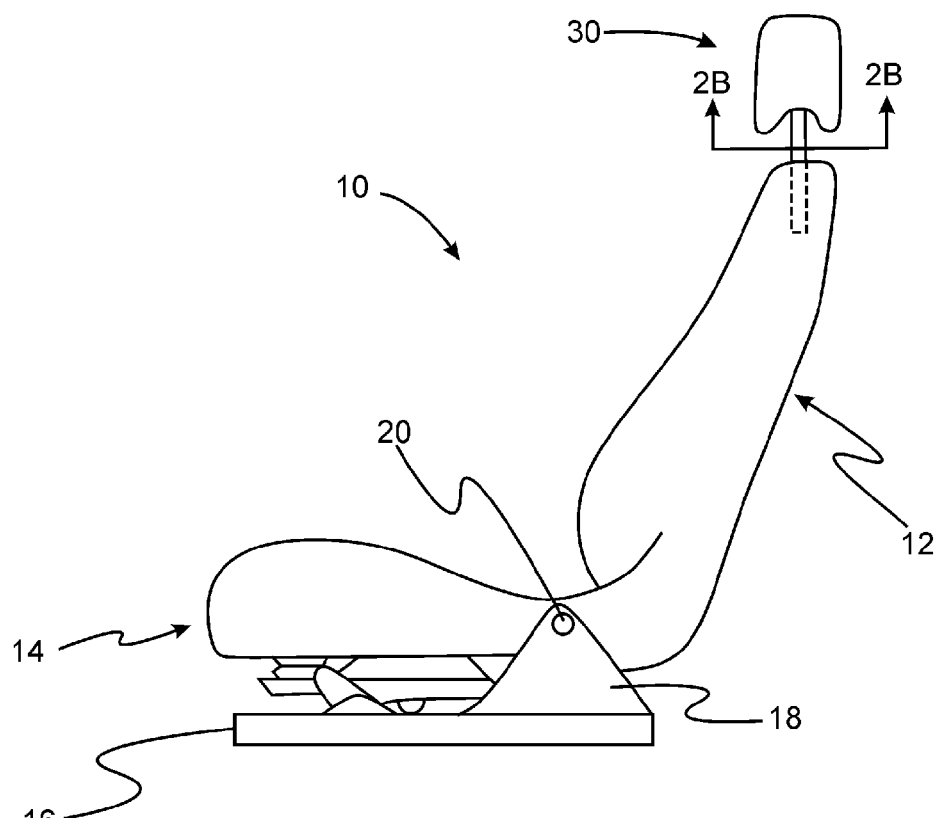
FIG. 1 is a schematic illustration of a vehicle seat assembly that incorporates the head restraint of an embodiment of the present invention.

With reference to FIG. 1, a schematic illustration of a vehicle seat incorporating an embodiment of a head restraint of the present invention is provided. Vehicle seat assembly 10 includes seat back 12 and lower seat assembly 14. Typically, lower seat assembly 14 is supported on seat track mechanism 16, as is commonly known in the art. In one variation of the present embodiment, seat back 12 is pivotally connected to the lower seat assembly 14 by means of a bracket 18 via pivot point 20 that is connected to the seat track mechanism 16. Vehicle seat assembly 10 includes head restraint assembly 30 of the present embodiment.

Figure 2A:
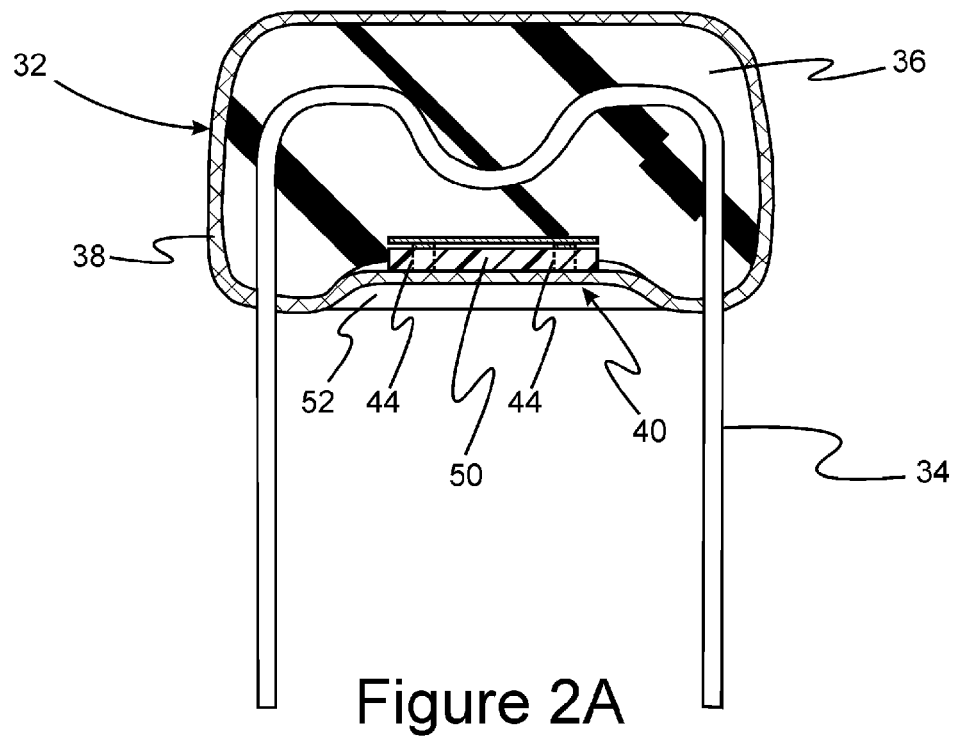
FIG. 2A is a longitudinal cross-section of an embodiment of the head restraint assembly of the present invention.
Figure 2B:
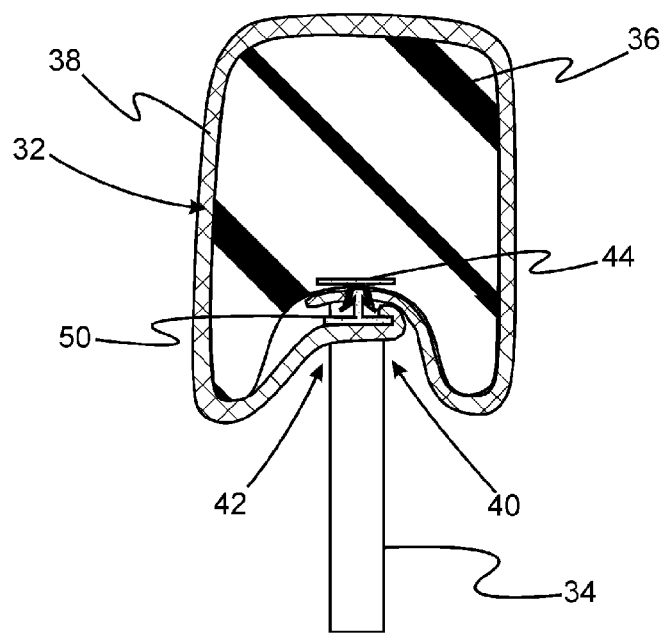
FIG. 2B is a cross-section of an embodiment of the head restraint assembly of the present invention taken at a plane that is perpendicular to the cross-section of FIG. 2A.

With reference to FIGS. 2A and 2B, schematic cross-sections of head restraint assembly 30 are provided. FIG. 2A is a longitudinal cross-section of head restraint assembly 30. FIG. 2B is a cross-section of head restraint assembly 30 taken at a plane that is perpendicular to the cross-section of FIG. 2A. Head restraint assembly 30 includes bun 32 which is attached to post 34. Post 34 engages vehicle seat 10. Typically, post 34 moveably engages vehicle seat 10 so that the position of the head restraint assembly relative to vehicle seat 10 may be adjusted. Bun 32 includes head restraint core 36 and trim cover 38. Trim cover 38 surrounds at least a portion of head restraint core 36. Trim cover 38 can be made of any suitable material of the type commonly employed in the related art, such as leather, polyvinyl, or fabric. Typically, trim cover 38 has a class-A surface visible from a vehicle interior and a class-B surface adapted to contact the head restraint core. In a variation of the present invention, head restraint core 36 is a foamed head restraint core. Typically, such foam head restraint cores comprise a resin foam such as polyurethane or polyester. Head restraint core 36 defines trim cover attachment region 40 which is a position at which foam head restraint core 36 is attached to trim cover 38. When open, trim cover 38 is generally pouch-shaped so that head restraint core 36 may be placed therein during assembly of head restraint assembly 30. Trim cover 38 includes close-out section 42. It is at closeout section 42 where trim cover 38 is closed after head restraint core 36 is placed within trim cover 38.

Still referring to FIGS. 2A and 2B, at least one retainer clip 44 is attached to head restraint core 36 at trim cover attachment region 40. In a variation of the present embodiment, two or more retainer clips are used. Attachment of retainer clip 44 to head restraint core 36 may be accomplished by mechanical fastening (e.g., bolting, sewing, etc), by application of an adhesive, or by embedding of a portion of retainer clip 44 into head restraint core 36 during formation of head restraint core 36. Embedding of retainer clip 44 is particularly useful when head restraint core 36 comprises a resin and, in particular, a foamed resin. Head restraint assembly 30 also includes closeout retainer bracket 50. Close-out retainer bracket 50 is attached to close-out section 42 and to retainer clip 44 thereby securing trim cover 38 to head restraint core 36. Closeout retainer 50 is attached to closeout section 42 of trim cover 38 by any suitable means. Examples of useful attachment mechanisms include, but are not limited to, mechanical fastening (e.g., bolting, sewing, etc) and to application of an adhesive. In a variation of the present embodiment, two or more retainer clips are used to secure trim cover 38 to head restraint core 36. In the specific variation depicted in FIGS. 2A and 2B, attachment region 40 is situated in depression 52 within head restraint core 36. Advantageously, retainer clip 44 and retainer bracket 50 act to hold cover 50 within this depression with substantially little or no bridging. Specifically, cover 38 is held in a depressed configuration in the vicinity of depression 52.

Retainer clip(s) 44 and retainer bracket 50 are independently made from any material or combination of material suitable for forming head restraint components. Examples of such materials include, but are not limited to plastic, metal, metal-plastic composites, and the like.

Figure 3:
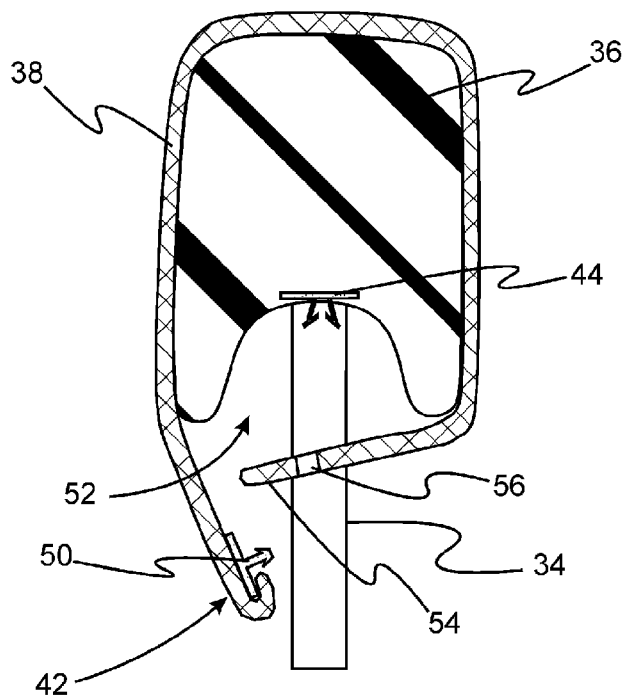
FIG. 3 is a schematic cross-section of an embodiment of the head restraint assembly of the present invention with an open trim cover.

With reference to FIG. 3, a schematic cross-section of the head restraint assembly depicted in FIGS. 2A and 2B with trim cover 38 opened is provided. As set forth above, trim cover 38 is general pouch-shaped when open. Close-out retainer bracket 50 is attached to trim cover 38 at closeout section 42. After head restraint core 36 is placed within trim cover 38, close out section 42 is folded to engage retainer clip 44. End 54 of trim cover 38 includes one or more holes 56 which allow clip(s) 44 to pass. This allows end 54 to be held in place when trim cover 38 is closed (see FIG. 2B).

Figure 4:
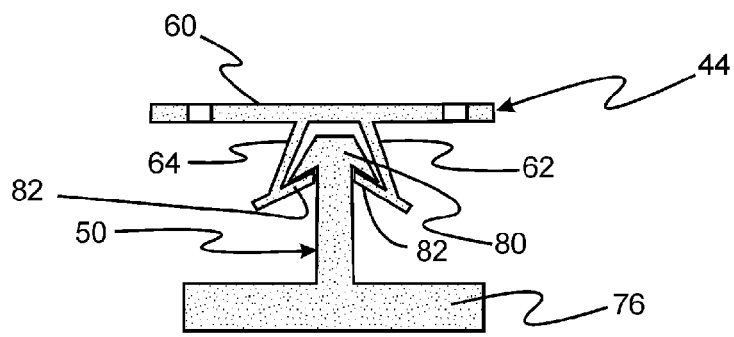
FIG. 4 is a cross-section showing the attachment of a retainer clip to a closeout retainer bracket.
Figure 5:
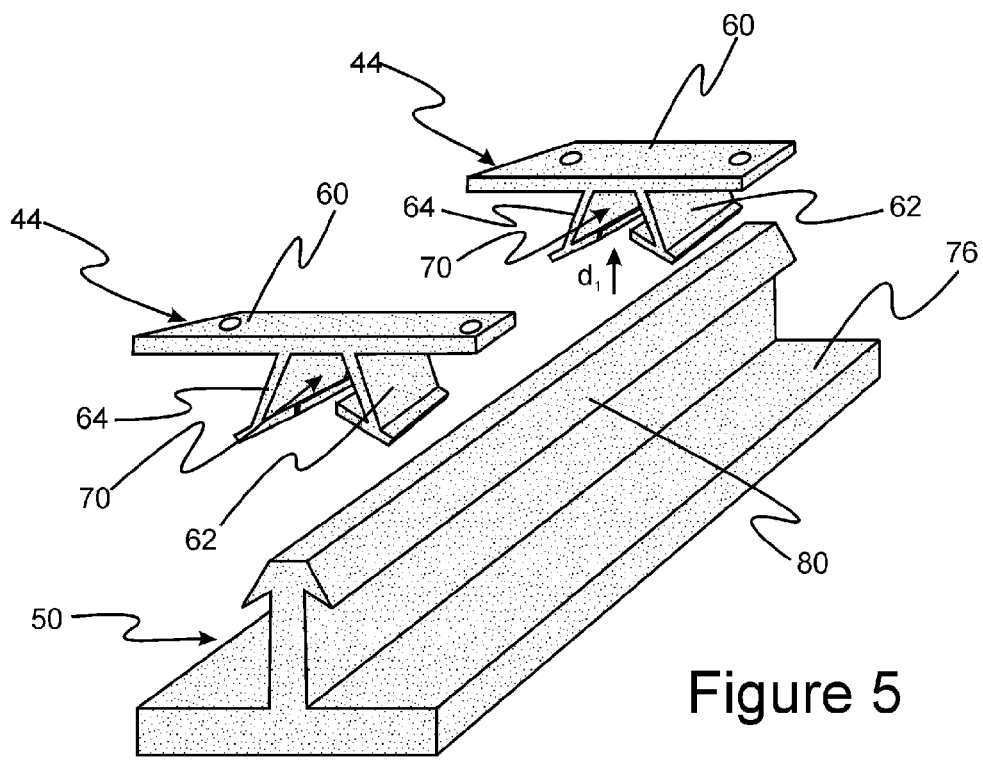
FIG. 5 is a perspective view of retainer clips and a closeout retainer bracket.

With reference to FIGS. 4 and 5, schematic illustrations of a variation of retainer clip 44 and close-out retainer bracket 50 are provided. FIG. 4 provides a cross-section showing the attachment of retainer clip 44 to closeout retainer bracket 50. FIG. 5 provides a perspective view of retainer clip 44 and closeout retainer bracket 50. In this variation, retainer clip 44 comprises clip base section 60 and side walls 62, 64. Clip base section 60 together with side walls 62, 64 define channel 70 which is adapted to mate with close-out retainer bracket 50. In the present variation, channel 70 is somewhat V- or U-shaped. In the variation depicted in FIGS. 4 and 5, closeout retainer bracket 50 includes bracket base section 76 adapted to be attached to close-out section 42 of trim cover 36. Close-out retainer bracket 50 further comprises barbed section 80 adapted to be inserted into retainer clips 44 by movement along direction $d_1$. In order to retain closeout retainer bracket 50, retainer clips 44 include protrusions 82 that extend into channel 70 which secure retainer bracket 50 by inhibiting its removal from the retainer clip.

Figure 6:
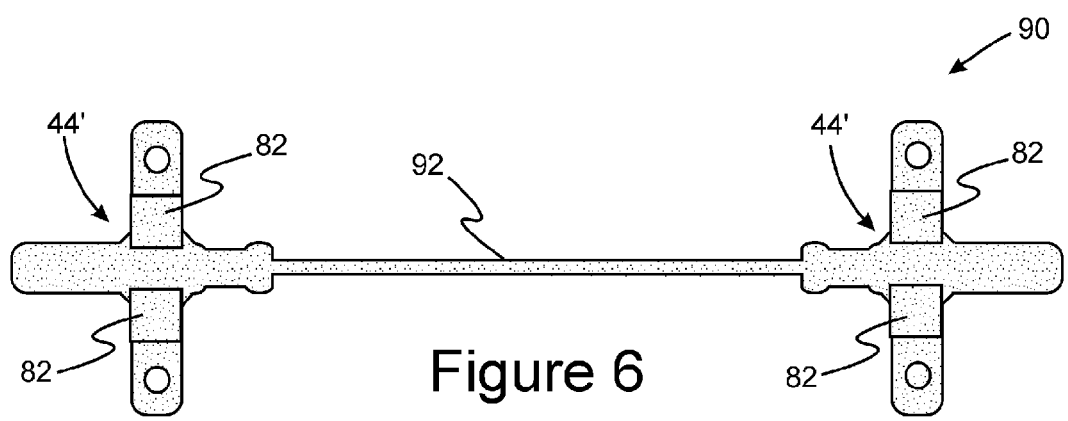
FIG. 6 is a top view of a multi-clip assembly useful in the head rest assemblies of various embodiments of the invention.

With reference to FIG. 6, a top view of a multi-clip assembly is useful in the head rest assemblies of various embodiments of the invention. Multi-clip assembly 90 includes retainer clips 44'. Retainer clips 44' are attached to each other via attachment member 92. Each of retainer clips 44' are described by the cross-section set forth in FIG. 4 set forth above.

Figure 7:
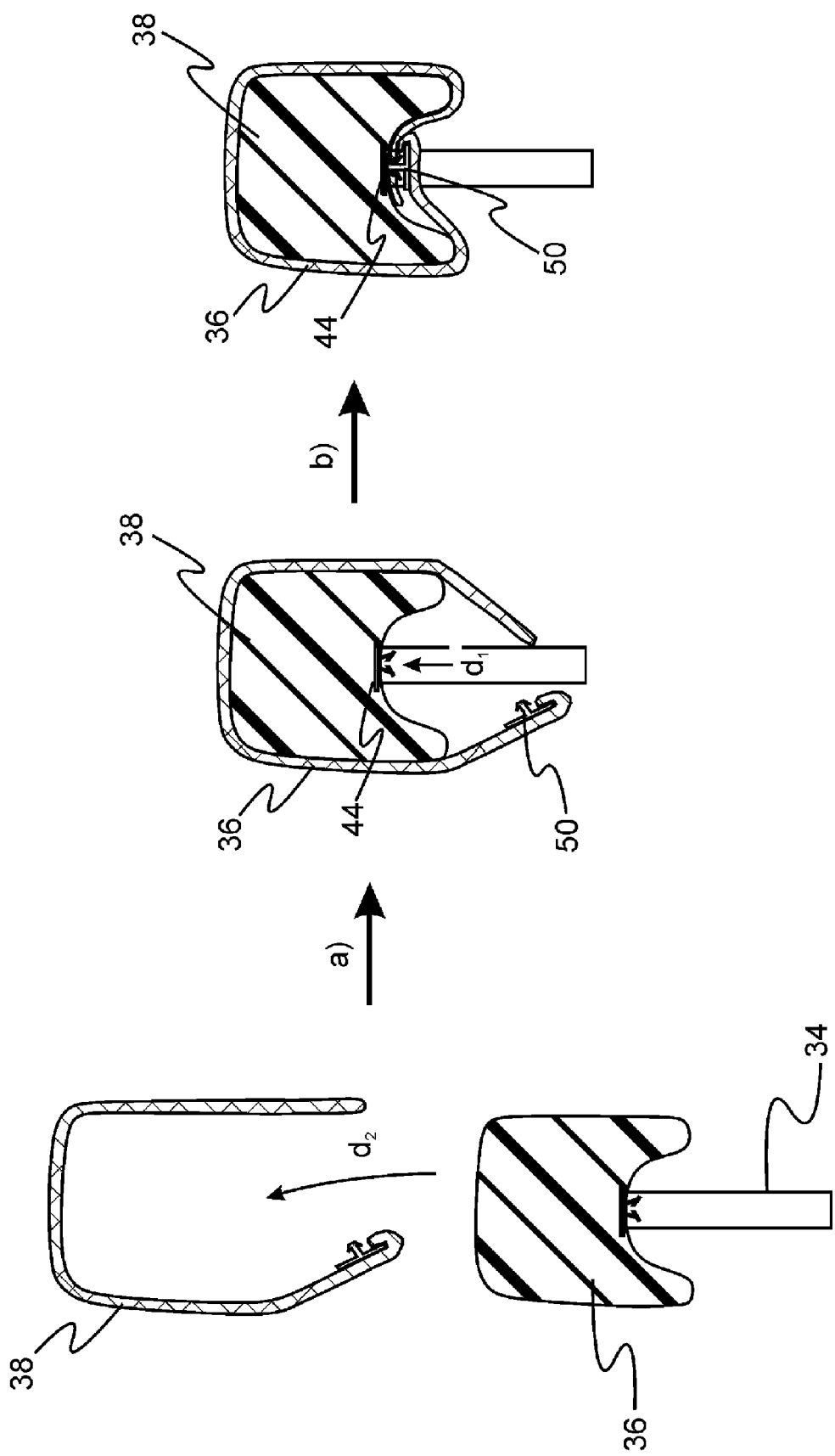
FIG. 7 is a schematic illustrating the assembling of an embodiment of the present invention's head restraint.

In another embodiment of the present invention, a method for assembling the head restraint assembly set forth above is provided. FIG. 7 is a schematic illustrating the assembling of an embodiment of the present invention's head restraint. In step a), head restraint core 36 is placed within trim cover 38 by movement along direction $d_2$. In a variation, trim cover 38 may initially be inverted to assist in this step. In step b), trim cover 38 is closed by engaging clip(s) 44 with closeout retainer bracket 50.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An assembly comprising:
   a core having a trim cover attachment region;
   a trim cover having a closeout section and a trim cover end with openings;
   a closeout retainer bracket attached to the closeout section; and
   a retainer clip attached to the core at the trim cover attachment region, the retainer clip having a clip base section and two side walls, the clip base section and the two side walls defining a channel adapted to mate with the closeout retainer bracket and each side wall has a protrusion that extends into the channel for holding the closeout retainer bracket therein, the two side walls at least partially protruding through the openings in the trim cover end.

2. The assembly of claim 1 wherein the core comprises a foamed resin.

3. The assembly of claim 1 wherein the retainer clip is mechanically or adhesively attached to the core.

4. The assembly of claim 1 wherein the retainer clip is partially embedded within the core.

5. The assembly of claim 1 wherein more than two retainer clips are used to secure the trim cover to the core.

6. The assembly of claim 1 wherein two or more retainer clips are used to secure the trim cover to the core, the two retainer clips being connected to each other by an attachment member.

7. The assembly of claim 1 wherein the two or more retainer clips are attached to a single bracket.

8. The assembly of claim 1 wherein the closeout retainer bracket comprises a bracket base section adapted to be attached to the closeout section.

9. The assembly of claim 1 wherein the closeout retainer bracket further comprises a barbed section adapted to be inserted into the retainer clip.

10. The assembly of claim 1 wherein the closeout retainer bracket is attached to the trim cover by sewing or by an adhesive.

11. The assembly of claim 1 wherein the post comprises two legs and a cross member disposed therebetween.

12. The assembly of claim 1 wherein the trim cover has a class-A surface visible from a vehicle interior and a class-B surface adapted to contact the core.

13. The assembly of claim 1 wherein the trim cover comprises a material selected from the group consisting of leather, polyvinyl, fabric, and combinations thereof.

14. An assembly comprising:
   a post adapted to engage a vehicle seat;
   a foamed core having a trim cover attachment region;
   a trim cover having a closeout section and a trim cover end with openings;
   a closeout retainer bracket attached to the closeout section; and
   a retainer clip attached to the core at the trim cover attachment region, the retainer clip having a clip base section and two side walls, the clip base section and the two side walls defining a channel adapted to mate with the closeout retainer bracket and each side wall has a protrusion that extends into the channel for holding the closeout retainer bracket therein, the side walls at least partially protruding through the openings in the trim cover end.

15. The assembly of claim 14 wherein two or more retainer clips are used to secure the trim cover to the core.

16. The assembly of claim 15 wherein the two or more retainer clips are attached to a single bracket.

17. The assembly of claim 15 wherein the closeout retainer bracket further comprises a barbed section adapted to be inserted into the retainer clip.

18. The assembly of claim 14 wherein the closeout retainer bracket comprises a bracket base section adapted to be attached to the closeout section.

* * * * *